3,338,847
SILICONE RUBBER FOAM COMPOSITIONS
Siegfried Nitzsche, Manfred Wick, and Paul Hittmair, Burghausen, Bavaria, Germany, assignors to Wacker-Chemie G.m.b.H., Munich, Germany
No Drawing. Filed June 19, 1964, Ser. No. 376,578
Claims priority, application Germany, June 28, 1963, W 34,795
14 Claims. (Cl. 260—2.5)

This invention relates to novel compositions of matter which are employed in the preparation of silicone rubber foams. A method of preparing silicone rubber foams and a composition particularly suited for such method are the primary concerns of this invention.

The preparation of elastomeric foams and particularly of silicone rubber foams has been the subject of much research and development in recent years. Various methods have been disclosed for foaming polymeric materials at room temperature. One very desirable characteristic for such foaming methods is the use of ingredients which will react to form the gasses which produce the foam rather than employing external sources of propelling gasses.

There is a positive requirement in all the foam systems that the foaming process and a gelling or curing process occur at approximately the same time. If the gelling or curing occurs too soon, the foam will not have an opportunity to form and if the gelling or curing occurs too late, the foam will form and collapse before it is cured. This relatively critical requirement has proved to be a very difficult problem in the development of elastomeric foams employing room temperature curing silicone rubber stocks.

A further problem in the development of room temperature curing silicone rubber foams has been the insufficient supply of gas from the reactants employed. The systems heretofore employed were mixtures of hydroxylated diorganosiloxane polymers, crosslinking SiH containing organosilicon monomers and polymers, and condensation catalysts such as certain metal salts of carboxylic acids. These reactants produce insufficient gas at room temperature to provide a satisfactory foam. To overcome this deficiency, saturated silanols and/or low molecular weight siloxanols have been added to the mixtures to provide additional gas formation. This improved the gas formation and produced lighter foams but the cell size and uniformity proved to be unsatisfactory. The product remained too dense (i.e. 3–4 g./cm.³), of uneven structure and was not sufficiently soft.

It is an object of this invention to introduce a room temperature curing silicone rubber foam which avoids the problems outlined above. Another object is to introduce a method of preparing a silicone rubber foam at room temperature whereby a soft, resilient, fine pore foam of even cell structure and low density is obtained. A novel composition of matter suitable for use in preparing silicone rubber foams is also an object of this invention. Other objects and advantages of this invention are detailed in or will be apparent from the disclosure and claims following.

This invention relates to a mixture of (1) essentially linear hydroxyl endblocked organosiloxane polymers having an organic substituent to silicon ratio in the range from 1.9/1 to 2.0/1 as the basic ingredients; (2) at least one organosilicon compound containing hydrogen atoms bonded directly to silicon as a crosslinking agent and hydrogen donor; (3) at least one unsaturated-organo silanol or siloxanol as a hydrogen donor and foam regulator; and (4) at least one condensation catalyst active at room temperature.

The novel ingredient employed herein is (3) the unsaturated organo silanol or siloxanol. A completely uniform foam structure exhibiting the desired physical and chemical properties is achieved with them.

The siloxane polymers employed herein as the major ingredient in the compositions are essentially linear, hydroxyl endblocked diorganosiloxane polymers. The operable polymers have a viscosity at 25° C. of 50–150,000 cs. with better results achieved in the range 100–100,000 cs. and the best results in the range 250–20,000 cs. These polymers are characterized by the average general formula $HO(R_2SiO)_nH$ where R is a monovalent hydrocarbon radical or halogenated monovalent hydrocarbon radical, preferably alkyl, aryl, halogenoalkyl or halogenoaryl and $n$ is 50–5000, preferably 250–800. These polymers can contain limited proportions of $R'SiO_{3/2}$, $R'_2SiO$, $R'_3SiO_{1/2}$ and $SiO_{4/2}$ units where R' is a hydrogen atom, hydroxyl group or R radical. These polymers are described in some detail in U.S. Patent No. 2,999,077, German patent publication No. 1,058,254 and U.S. Patent No. 3,127,363, all of which are hereby incorporated herein by reference. The monovalent organic radicals represented by R and bonded to Si through C-Si linkage can be selected from the group consisting of alkyl radicals, aryl radicals, alkenyl radicals, aralkyl radicals, alkaryl radicals, cycloaliphatic radicals and halogenated derivatives thereof as fully described in U.S. Patents Nos. 3,108,898; 3,111,535 and 3,065,194. Preferably at least 50 percent of the radicals are methyl radicals and preferred siloxanes contain radicals selected from methyl, ethyl, phenyl and 3,3,3-trifluoropropyl substituents. Most preferred are the hydroxyl endblocked dimethylsiloxane polymers and the closer the average R/Si ratio approaches 2.0/1 the better the polymer for this purpose. The radicals represented by R' can be any of those set forth above as well as hydrogen atoms and/or hydroxyl radicals. The R'/Si ratio is preferably less than 0.1/1 and should be as close to 0 as is practical. The siloxane (1) is employed in amounts of from 20–60 percent, preferably 30–50% by weight based on the total weight of the compositon.

The crosslinking agents (2) employed herein are described in German patent publication No. 1,058,254 and U.S. Patents Nos. 3,127,363; 3,082,527 and 3,086,953, said patents being incorporated herein by reference. These crosslinking agents (2) must have at least one hydrogen atom bonded directly to silicon in each molecule. Organohydrogensilanes of the formula $R_xSiH_{4-x}$ and organohydrogensiloxanes of the unit formula

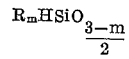

where $x=1-3$, $m$ has a value up to and including 2.0 and R is as above defined are operable herein. Preferred are low viscosity polymeric fluids of 10–1000 cs. viscosity at 25° C., most preferably 20–250 cs., of the unit formula $CH_3SiHO$. An unusual and interesting embodiment of this invention employs a siloxane copolymer which supplies the required hydroxyl radicals as defined in ingredient (1) and the required hydrogen atoms bonded to Si as required in ingredient (2). Thus, this single copolymer would serve as ingredients (1) and (2) herein. Such copolymers are fully disclosed and defined in U.S. Patent No. 3,070,555, which is incorporated herein by reference.

In addition to the silanes and siloxanes described in the preceding paragraph, the crosslinking agent can be any Si-H containing organosilicon compound obtained, for example, by hydrolysis of $HSiCl_3$ or by gassing or impregnating silicic acids (e.g., silicas) with $HSiCl_3$ or organohydrogensilanes or siloxanes as described in Austrian Patent No. 205,743 and elsewhere in the literature. The hydrogen-silicon containing crosslinking compound is employed in proportions of from 0.5 to 50 percent, preferably 5–20 percent by weight based on the total weight of the composition.

The novel component employed herein is at least one silanol or low viscosity siloxanol wherein the organic substituents bonded to silicon include unsaturated radicals such as vinyl, allyl, propenyl, butenyl, cyclohexenyl, and other alkenyl and cycloalkenyl radicals. These silanes contain at least one unsaturated organic group and one OH per molecule, the remaining substituents being hydrogen atoms and other monovalent hydrocarbon radicals. The siloxanes are merely low molecular weight polymers prepared by hydrolysis and/or condensation of silanes satisfying the foregoing requirements, particularly useful are vinylmethylsilanediol and its low molecular weight condensation products having an average of up to 100 Si atoms per molecule and characterized by the general formula $HO(ViMeSiO)_aH$ where Vi is vinyl, Me is methyl and $a$ has an average value from 2 to 100. Other examples of operable monomers and polymers include $ViPhSi(OH)_2$, $Vi(C_6H_5C_2H_4)Si(OH)_2$
$CH_2{:}CHCH_2(CH_3)Si(OH)_2$, $ViSi(OH)_3$, and
$CH_2{:}CHCH_2Si(OH)_3$ and their low molecular weight siloxanes prepared by partial condensation, as well as $Ph_2ViSiOH$, $Me_2ViSiOH$, $Vi_2MeSiOH$, $CH_2{:}CHCH_2Me_2SiOH$ $CH_2{:}CHCH_2ViMeSiOH$ and similar monofunctional silanols. Also operative are oily block copolymers of the foregoing silanols and siloxanols with di- or polyhydric organic alcohols such as glycols, polyglycols, glycerine and pentaerythritol wherein the ratio of silanol or siloxanol to alcohol can vary over wide limits but a copolymer having a ratio from 40/60 to 60/40 is preferred. The silanols and siloxanols employed as component (3) are employed in quantities of about 10–75 percent, preferably 20–40 percent by weight based on the total weight of the composition.

The catalysts which are component (4) herein include metallic salts of organic monocarboxylic acids as described in the aforementioned U.S. Patent No. 3,127,363 as well as in U.S. Patent No. 2,843,555. Preferred are stannous compounds such as stannous alcoholates wherein the alcohol radical displays 4–10, preferably 6–8 carbon atoms, stannous-n-octoate and stannous isobutyrate. Stannous soaps are also useful such as stannous diricinoleate, stannous dioleate, stannous distearate, stannous dilinoleate, stannous dinaphthenate, stannous dibenzoate, stannous dinaphthoate and stannous dilaurate. Other metallic salts mentioned in the aforementioned patents can also be employed.

The catalysts are employed in proportions of from 0.5–15 percent, preferably 1–5 percent, by weight based on the total weight of the composition. The curing system herein is based upon the disclosures set forth in German patent publication No. 1,058,254 and Austrian Patent No. 205,743.

In addition to the four required ingredients outlined above, it has been found useful to add certain siloxanes as softeners. Very soft foams can be obtained by adding (5) certain endblocked diorganosiloxane polymers of 15–35,000 cs. viscosity at 25° C. (preferably 50–5000 cs.).

The endblocked siloxanes useful as softeners include: (a) alkoxy endblocked diorganosiloxane oils; (b) triorganosilyl endblocked diorganosiloxane fluids, and (c) triorganooxysilyl endblocked diorganosiloxane fluids.

The alkoxy endblocked oils ($5a$) were well known and are relatively low molecular weight polymers made up of $R_2SiO$ units where R is as above defined with alkoxy endblocking units such as methoxy, ethoxy and butoxy.

The triorganosilyl endblocked fluids ($5b$) are of the formula $Z_3SiO[Z_2SiO]_bSiZ_3$ where Z is an alkyl, aryl, aralkyl or alkenyl radical, preferably a methyl radical, and $b$ is 2–5000, preferably 250–800. The use of the siloxane ($5b$) in room temperature vulcanizing silicone rubber materials is disclosed and discussed in U.S. Patent No. 3,070,566, issued December 25, 1962 (and see also French Patent No. 1,247,170). Illustrative of these fluids are trimethylsilyl and triethylsilyl endblocked dimethylsiloxane oils, and triphenylsilyl endblocked dimethylsiloxanes which contain less than 2 mol percent of methylvinylsiloxane units.

The triorganooxy silyl endblocked fluids ($5c$) are of the general formula $(Z'O)_3SiO(Z''_2SiO)_bSi(OZ')_3$ where Z' is an alkyl, aralkyl or phenyl radical, Z'' is a monovalent hydrocarbon or halogeno hydrocarbon radical and $b$ is as above defined. The siloxanes ($5c$) are prepared according to the teachings of U.S. patent application Serial No. 325,504, filed November 26, 1962. Illustrative of these polymers are trimethoxysilyl, tributoxysilyl, triethoxysilyl, trimethoxyethoxysilyl, and tripropoxysilyl endblocked dimethylsiloxanes.

The softener, component 5, is added in quantities of from 5 to 50, preferably 10 to 20, percent by weight based on the total weight of the composition. It is, of course, totally unexpected that the polyfunctional polymer defined as ($5c$) above does not act as a crosslinking agent in the quantities employed.

In addition to the ingredients described in detail above, the compositions of this invention can contain fillers, pigments, and other known additives employed in elastomeric foams. The ingredients are merely mixed and exposed to atmospheric moisture whereupon the foaming occurs. The procedures described in U.S. Patent No. 3,070,555 are particularly useful herein.

The foams obtained with the compositions and according to the method of this invention can be controlled as to density by controlling the proportion of ingredient (3) present. At the same time, foam softness can be controlled by adjusting the proportion of ingredient (5) present. In general, elastomeric foams are obtained characterized by 0.1 to 0.2 g./cm.$^3$ density, soft touch and little or no residual pressure deformation (so called "compression set"), fine porosity and uniform pores as well as by heat, cold and hydrolysis stability and excellent resistance to weathering.

These elastomeric foams are useful in applications requiring the cushioning effect of soft foams, as thermal insulation, as noise deadening layers on automobile bodies and in other areas, and for protecting delicate instruments by surrounding them with a cured foam. Other uses are known and will be apparent to those skilled in the art and aware of the prior art.

The following examples are included to assist those skilled in the art in practicing this invention. The scope of the invention is delineated in the claims and is not restricted in any way by the examples. All parts and percentages are based on weight and all viscosities are expressed as measured at 25° C. unless otherwise specified. The symbols Me, Ph, Vi, Et, etc., are employed in various places in this disclosure to represent methyl, phenyl, vinyl and ethyl radicals.

*Example 1*

A mixture (A) was prepared from 60 parts of hydroxyl endblocked dimethylsiloxane of 1000 cs. viscosity, 10 parts by weight of methylhydrogensiloxane of 30 cs. viscosity, 40 parts of vinylmethylsilane diol and 20 parts finely divided diatomaceous earth. This mixture was completely stable on storage. The mixture was further mixed and 5 percent of stannous octoate was stirred into the mass. The material began to foam after the tin compound was added and after five minutes it has foamed and cured to form an elastic, white, fine-pored foam with a specific weight of 0.15 g./cm.$^3$ and having a pore size of about 0.05 to 0.2 mm. This foam remained unchanged after 14 days of storage for 150° C.

A comparative experiment (B) conducted precisely as the foregoing but employing 40 parts of hydroxyl endblocked dimethylsiloxane polymer with a viscosity of 20 cs. in place of the vinylmethylsilane diol, produced a foam having a much higher density of 0.4 g./cm.³ and a large and variable pore size of 0.2 to 0.6 mm.

Example 2

The mixture described as (A) above was varied by substituting low molecular weight vinylmethylsiloxanols having 2–10 silicon atoms per molecule for the vinylmethylsilane diol and the foams produced were fully equivalent to those prepared with mixture A in Example 1.

Example 3

The mixture described as (A) in Example 1 was modified by adding 10 percent tributoxysilyl endblocked dimethylsiloxane polymer of 10,000 cs. viscosity prior to the addition of the stannous octoate. Upon adding the tin salt, foaming and curing occurred as in Example 1 to produce an excellent elastic foam which was considerably softer and more elastic to the touch than the product prepared in Example 1 with mixture A.

Example 4

A mixture (C) was prepared from 60 parts hydroxyl endblocked dimethylsiloxane polymer with a viscosity of 1,000 cs., 50 parts phenylvinylsilane diol, 10 parts methylhydrogensiloxane polymer of about 30 cs. viscosity, and 20 parts trimethylsilyl endblocked dimethylsiloxane polymer of 35 cs. viscosity as well as 40 parts quartz flour. Stannous octoate as condensation catalyst was added to give 4 percent stannous octoate in the mass and the mass was poured into an electronic element wrapped in aluminum foil. After 10 minutes the foil was removed. The electronic element was encapsulated in a white, elastic, very soft and uniform silicone rubber foam exhibiting a smooth surface. This experiment was repeated employing 50 parts of phenylvinylsiloxanols prepared by partial condensation of the phenylvinylsilane diol and having up to 10 Si atoms per molecule in place of the phenylmethylsilane diol and the results achieved were substantially identical.

For comparative purposes, a mixture (D) was prepared as above but using 20 parts of ethanol in place of the 50 parts phenylvinylsilane diol. The resulting foam had coarse pores of uneven size and exhibited a rough surface broken by many bubbles.

Example 5

The following two mixtures were prepared:

Mixture E:
    100 parts hydroxyl endblocked dimethylsiloxane polymer, 20,000 cs.
    20 parts diphenylvinylsilanol
    10 parts methylhydrogensiloxane polymer, 30–50 cs.
    50 parts siliceous chalk Mixture F:
    100 parts hydroxyl endblocked dimethylsiloxane as in E
    5 parts stannous octoate
    50 parts siliceous chalk
    0.1 part inorganic dye pigment A foaming mass was prepared by thoroughly mixing 10 parts Mixture E with 10 parts of Mixture F until a uniformly colored mass was obtained. The mass was poured into a U-shaped metal strip. After 20 minutes, there was obtained a sponge rubber-like strip of silicone rubber foam having a specific weight of 0.6 g./cm.³ and an extremely uniform and fine pored structure could be removed from the metal strip.

Example 6

Mixture F in Example 5 was modified by adding 75 parts of a 20,000 cs. viscosity dimethylsiloxane oil endblocked with triphenylsilyl groups and dimethylvinylsilyl groups, 10 parts siliceous chalk and 5 parts stannous octoate. This modified mixture F was admixed with an equal weight of mixture E and the mass was poured into a U-shaped metal mold. After 20 minutes, foamed elastomeric strips were obtained which were eminently suited for use as window and door seals because of their high stability and low durometer (on the Shore scale). These strips were easily removed from the metal strips acting as molds.

Example 7

A mixture was prepared from 100 parts hydroxyl endblocked dimethylsiloxane polymer of 2,500 cs. viscosity, 40 parts vinyl-beta-phenylethylsilane diol and 10 parts methylhydrogensiloxane polymer (30–50 cs.) and 10 percent stannous octoate was added thereto whereupon the mass foamed and cured. After 5 minutes of foaming and curing there was obtained a white, elastic, fine-pored silicone rubber foam having a specific weight of 0.12 g./cm.³. This foam remained essentially unchanged after storage for seven days at 250° C. Essentially the same foam was obtained by employing a low molecular weight siloxanol prepared by condensing vinyl-beta-phenylethylsilane diol to produce siloxanols of up to 10 silicon atoms in place of the silane diol in the mixture of this example.

Example 8

Mixture G was prepared from 100 parts hydroxyl endblocked dimethylsiloxane polymer of 5000 cs. viscosity, 40 parts block copolymer of a vinylmethylsiloxanol pentamer and glycol in a mol ratio of 10:1, 15 parts methylhydrogensiloxane polymer of 30 cs. viscosity and 40 parts gypsum powder. This mixture was poured into a mold 5 cm. wide with commercial glass cloth covering the walls of the mold. After adding 1.5 percent stannous octoate as catalyst to the mixture, the mass foamed. After 10 minutes the foamed silicone rubber was removed from the mold. The foam had a specific weight of 0.25 g./cm.³ and was extremely stable mechanically so that it could be placed around a tube or other equipment as thermal or shock insulation.

For comparison, mixture G was reproduced using acetic, isobutyric and malonic acids as in U.S. Patent No. 3,070,555 in place of the block copolymer and the resulting foams had coarse porses, uneven pore sizes and unsatisfactory specific weights. These heavy foams broke between the fiber of the glass cloth when bent.

Example 9

A mixture was prepared using 40 parts hydroxyl endblocked dimethylsiloxane polymer of 80,000 cs. viscosity, 20 parts triethoxysilyl endblocked dimethylsiloxane polymer of 250 cs. viscosity and 20 parts of fine quartz flour. Into this mass were stirred 30 parts methylvinylsilane diol, 10 parts methylhydrogensiloxane (30 cs. viscosity) and 5 per cent stannous isobutyrate. A very soft, fine pored silicone rubber foam having a density of 0.5 g./cm.³ and characterized by good physical strength was obtained from this mass after a few minutes.

For the following examples a basic mass or masterbatch was prepared from 10 parts linear dimethylsiloxane polymer having hydroxyl end groups and a viscosity of 20,000 cs., 25 parts linear dimethylsiloxane polymer having hydroxyl end groups and a viscosity of 500 cs., and 5 parts calcined diatomaceous earth.

Example 10

A mixture was prepared from 15 g. of the above masterbatch, 8 g. of low molecular weight hydroxyl endblocked methylvinylsiloxane polymer of 30 cs. viscosity, 2 g. methylhydrogensiloxane polymer of 30 cs. viscosity and 2 g. stannous octoate. The mass was allowed to foam and cure. After about 3 minutes the mass had foamed and cured to produce an elastic, very fine pored foam with a specific weight of 0.12 g./cm.³. The foam structure disclosed by cutting through the foam was velvety soft and the individual pores were invisible to the naked eye.

Example 11

A mixture was prepared with 15 g. of the masterbatch, 8 g. of hydroxyl endblocked phenylvinylsiloxane having a viscosity of 30 cs., 2 g. methylhydrogensiloxane (30 cs.) and 2 g. stannous octoate. This mass foamed and cured within 3 minutes to form a fine pored, uniform foam having a density of 0.14 g./cm.$^3$.

Example 12

A mixture was prepared with 15 g. of the masterbatch, 4 g. of ethanol, 4 g. hydroxyl endblocked vinylmethylsiloxane (30 cs.), 2 g. methylhydrogensiloxane (30 cs.) and 2 g. stannous octoate. This mass foamed and produced an excellent, fine pored, uniform foam having a specific weight of 0.10 g./cm.$^3$.

For purposes of comparison, Example 10 was repeated employing (a) hydroxyl endblocked dimethylsiloxane polymer (30 cs.), (b) ethanol, (c) n-butanol, (d) glycerine (density 1.255 g./cc.), (e) hydroxyl endblocked phenylmethylsiloxane polymer (40 cs.), (f) glacial acetic acid and (g) ethylene glycol in place of the low molecular weight hydroxyl endblocked methylvinylsiloxane polymer. In every case the foam obtained was coarse and uneven. The individual foam cells were large and extremely variable in size resulting in an unsatisfactory foam.

Example 13

Equivalent results were achieved when mixture (A) was reproduced employing 60 parts of the following polymers in place of the hydroxyl endblocked dimethylsiloxane: $HO(CH_3CH_6H_5SiO)_nH$ where $n=250-800$, $$HO[(CH_3)_2SiO]_p[(C_6H_5)_2SiO]_qH$$

where $p=200-700$ and $q=50-250$, hydroxyl endblocked copolymers of dimethylsiloxane units and up to 5 mol percent of phenyl-, methyl-, or ethylsiloxane units containing 250–800 silicon atoms per molecule, $$HO[CF_3CH_2CH_2(CH_3)SiO]_nH$$

where $n=250-800$ and branched polymers containing up to 5 mol percent $CH_3SiO_{3/2}$ units, an equivalent proportion of $(CH_3)_3SiO[(CH_3)_2SiO]$ units and at least 90 mol percent $(CH_3)_2SiO$ units with hydroxyl endblockers.

Example 14

Equivalent results were achieved when the vinylmethylsilane diol in mixture A was replaced with any of the following:

$HO[CH_2=CH(CH_3)SiO]_aH$ where $a=2-100$,
$CH_2=CH(C_6H_5)Si(OH)_2$,
$CH_2=CH(C_6H_5CH_2CH_2)Si(OH)_2$,
$CH_2:CHCH_2(CH_3)Si(OH)_2$,
$CH_2=CHSi(OH)_3$,
$CH_2:CHCH_2Si(OH)_3$,
$(C_6H_5)_2CH_2=CHSiOH$,
$(CH_3)_2CH_2=CHSiOH$,
$(CH_2=CH)_2CH_3SiOH$,
$CH_2=CHCH_2(CH_3)_2SiOH$,
$CH_2=CHCH_2(CH_3)(CH_2=CH)SiOH$,
$HO[CH_2=CH(C_6H_5)SiO]_aH$,
$HO[CH_2=CH(C_6H_5CH_2CH_2)SiO]_aH$ and
$HO[CH_2=CHCH_2(CH_3)SiO]_aH$.

Example 15

Equivalent results were achieved in Example 14 using stannous-diricinoleate, -dioleate, -distearate, -dinaphthenate, -dibenzoate, -dilaurate or -dinaphthoate in place of the stannous octoate.

From the examples and comparative experiments set out above it is concluded, but this invention is not dependent upon these conclusions, that the difficulty of preparing elastomeric foams resides in the fact that as a result of the great reactivity of the difunctional siloxanes the reactions, which lead to propellant gas development and to crosslinking (vulcanization), occur so rapidly that very high degrees of expansion can usually not be obtained. If compounds are added which act as brakes to the reaction, viz., water, alcohol, glycol, or low molecular organosiloxanes with saturated aliphatic or aromatic groups on the silicon, the crosslinking or curing reaction is at first braked while the reaction supplying the propellant gas between the hydroxyl groups of the added decelerating compound with the H-siloxane is not sufficiently slowed down. This forces the formation of coarse pored or uneven foams. Surprisingly, however, the additive of the present discovery of low molecular α,o-dihydroxypolysiloxanes having an unsaturated aliphatic group on the silicon or their monomeric compounds such as vinylmethylsilane diol or α,o-dihydroxyvinylmethylpolysiloxane, regulates the crosslinking reaction and the reaction supplying the propellant gas in such a manner that extraordinary light and, at the same time, very fine-pored elastomeric foamed articles are obtained.

That which is claimed is:

1. A composition of matter consisting essentially of
   (1) an essentially linear hydroxyl endblocked diorganosiloxane polymer of 50 to 150,000 cs. viscosity at 25° C. consisting essentially of units of the general formula $R_2SiO$ any other units present being selected from the group consisting of units of the formulae $R'SiO_{3/2}$, $R'_2SiO$, $R'_3SiO_{1/2}$ and $SiO_{4/2}$ wherein each R is selected from the group consisting of monovalent hydrocarbon radicals and monovalent halogenohydrocarbon radicals and each R' is selected from the group consisting of hydrogen atoms, hydroxyl radicals, monovalent hydrocarbon radicals and halogenohydrocarbon radicals, the ratio of R/Si in said polymer being from 1.9/1 to 2.0/1 and the ratio of R'/Si being less than 0.1/1,
   (2) at least one organohydrogensilicon compound selected from the group consisting of fluid hydrolysis products of $HSiCl_3$, silanes of the general formula $R_xSiH_{4-x}$ and siloxanes of the unit formula $R_mHSiO_{3-m/2}$, where R is as above defined, $x$ has a value of 1, 2 or 3, and $m$ has an average value from 0 to 2.0, said compounds being fluids having viscosity not exceeding 1000 cs. at 25° C.,
   (3) at least one organohydroxy silicon compound wherein the organic substituents include aliphatically unsaturated organic radicals selected from the group consisting of (1) silanols of the formulae $ViPhSi(OH)_2$, $Vi(C_6H_5C_2H_4)Si(OH)_2$
   $CH_2=CHCH_2MeSi(OH)_2$, $ViSi(OH)_3$
   $CH_2=CHCH_2Si(OH)_3$, $Ph_2ViSiOH$
   $Me_2ViSi(OH)$, $Vi_2MeSi(OH)$
   $CH_2=CHCH_2Me_2SiOH$, $CH_2=CHCH_2ViMeSiOH$ and $ViMeSi(OH)_2$ wherein Vi is a vinyl radical, Ph is a phenyl radical and Me is a methyl radical, (2) low molecular weight homopolymeric siloxanols prepared from the silanols (1) and having an average 2–100 silicon atoms per molecule, (3) copolymers of said silanols or siloxanols and polydric organic alcohols wherein the organosilicon compound/alcohol ratio is from 40/60 to 60/40 on a mol percent basis,
   (4) a metal salt of a monocarboxylic acid, said ingredients being present in proportions based on total weight of the composition of from 20–60% of (1), 0.5–50% of (2), 10–75% of (3) and 0.5–15% of (4).

2. The composition of claim 1 wherein (1) is an essentially linear hydroxyl endblocked dimethylsiloxane polymer.

3. The composition of claim 1 wherein (2) is a methylhydrogensiloxane.

4. The composition of claim 1 wherein (3) is $$CH_2=CH(CH_3)Si(OH)_2 \text{ or}$$
$$HO[CH_2=CH(CH_3)SiO]_aH$$

where $a$ is 2–10.

5. The composition of claim 1 wherein (4) is a tin salt of a monocarboxylic acid.

6. The composition of claim 1 further characterized in that there is present (5) 5–50 percent by weight based on the total composition of an endblocked essentially diorganosiloxane polymer selected from the group consisting of alkoxy endblocked diorganosiloxane oils, triorganosilyl endblocked diorganosiloxane fluids and triorganooxysilyl endblocked diorganosiloxane fluids.

7. The composition of claim 6 wherein the ingredient (5) is a fluid alkoxy endblocked siloxane polymer of the general unit formula $R_2SiO$ where R is selected from the group consisting of monovalent hydrocarbon and halogeno hydrocarbon radicals.

8. The composition of claim 6 wherein the ingredient (5) is a fluid siloxane polymer of the general formula $Z_3SiO[Z_2SiO]_bSiZ_3$, where each Z is a monovalent radical selected from the group consisting of alkyl, aryl, aralkyl and alkenyl radicals and $b$ has an average value from 2–5000.

9. The composition of claim 6 wherein the ingredient (5) is a fluid siloxane polymer of the general formula $(Z'O)_3SiO[Z''_2SiO]_bSi(OZ')_3$ where Z' is a monovalent radical selected from the group consisting of alkyl, aralkyl and phenyl radicals, Z'' is a monovalent radical selected from the group consisting of hydrocarbon and halogeno hydrocarbon radicals and $b$ has an average value from 2–5000.

10. A composition of matter particularly suited for use in preparing silicone rubber foams at or near room temperature consisting essentially of
(1) 20–60 percent by weight based on the total composition of a hydroxyl endblocked diorganosiloxane polymer wherein the organic radicals bonded to silicon are selected from the group consisting of alkyl and aryl radicals, said polymer having an average of 50–5000 silicon atoms per molecule,
(2) 0.5–50 percent by weight based on the total composition of a methylhydrogensiloxane of 10–1000 cs. viscosity at 25° C.,
(3) 10–75 percent by weight based on the total composition of an aliphatically unsaturated organosilicon compound selected from the group consisting of (a) silanols of the formulae $$ViPhSi(OH)_2, Vi(C_6H_5C_2H_4)Si(OH)_2$$
$$CH_2=CHCH_2MeSi(OH)_2, ViSi(OH)_3$$
$$CH_2=CHCH_2Si(OH)_3, Ph_2ViSiOH, Me_2ViSiOH$$
$$Vi_2MeSiOH, CH_2=CHCH_2Me_2SiOH$$
$$CH_2=CHCH_2ViMeSiOH \text{ and } ViMeSi(OH)_2$$

wherein Vi is a vinyl radical, Ph is a phenyl radical and Me is a methyl radical, (b) low molecular weight homopolymeric siloxanols prepared from the silanols (a) and having an average of 2–100 silicon atoms per molecule, and (c) copolymers of said silanols (a) and siloxanols (b) with polyhydric organic alcohols wherein the organosilicon compound/alcohol ratio is from 40/60 to 60/40 on a mol percent basis,
(4) 0.5–15 percent by weight based on the total weight of the composition of a stannous carboxylate containing 4–10 carbon atoms and
(5) up to 50 percent by weight based on the total weight of the composition of a dimethylsiloxane polymer endblocked with groups selected from the group consisting of alkoxy radicals, trialkylsilyl groups and trialkoxysilyl groups.

11. A silicone composition suitable for preparing elastomeric foams at or near room temperature consisting essentially of
(1) a hydroxyl endblocked siloxane polymer of the general formula $HO(R_2SiO)_nH$ where R is a methyl radical, $n$ is 250–800,
(2) methylhydrogensiloxane polymers of 20–250 cs. viscosity at 25° C.,
(3) a hydroxylated silicon compound selected from
$CH_2=CH(CH_3)Si(OH)_2$
$CH_2=CH(C_6H_5)Si(OH)_2$
$(C_6H_5)_2CH_2=CHSiOH$
$(CH_3)_2CH_2=CHSiOH$
$CH_2=CH(C_6H_5CH_2CH_2)Si(OH)_2$
$HO[CH_2=CH(CH_3)SiO]_aH$
$HO[CH_2=CH(C_6H_5)SiO]_aH$
and $HO[CH_2=CH(C_6H_5CH_2CH_2)SiO]_aH$
where $a$ has a value from 2–100,
(4) a condensation catalyst selected from the group consisting of stannous octoate and stannous isobutyrate and
(5) a softening agent selected from the group consisting of trialkoxysilyl endblocked dimethylsiloxane polymers, trialkylsilyl endblocked dimethylsiloxane polymers, triphenylsilyl endblocked dimethylsiloxane polymers and dimethylvinylsilyl endblocked dimethylsiloxane polymers of 50–5000 cs. viscosity at 25° C., the aforesaid components being present in weight percentages based on the total weight of the composition as follows: (1) 30–50%, (2) 5–20%, (3) 20–40%, (4) 1–5% and (5) 10–20%.

12. A composition as set forth in claim 1 wherein a hydroxyl endblocked essentially linear dimethylsiloxane fluid containing at least some but not more than 10 mol percent of methylhydrogensiloxane units constitutes both the hydroxyl enblocked diorganosiloxane (1) and the organohydrogensilicon compound (2).

13. A composition as set forth in claim 10 wherein a hydroxyl endblocked essentially linear dimethylsiloxane fluid containing at least some but not more than 10 mol percent of methylhydrogensiloxane units constitutes both the hydroxyl endblocked diorganosiloxane (1) and the organohydrogensilicon compound (2).

14. A composition as set forth in claim 11 wherein a hydroxyl endblocked essentially linear dimethylsiloxane fluid containing at least some but not more than 10 mol percent of methylhydrogensiloxane units constitutes both the hydroxyl endblocked diorganosiloxane (1) and the organohydrogensilicon compound (2).

References Cited

UNITED STATES PATENTS 3,070,555  12/1962  Bruner _____ 260—2.5
3,070,566  12/1962  Nitzsche et al. _____ 260—825

MURRAY TILLMAN, *Primary Examiner.*

J. C. BLEUTGE, *Assistant Examiner.*